US008674827B2

(12) United States Patent
Hummer

(10) Patent No.: US 8,674,827 B2
(45) **Date of Patent: *Mar. 18, 2014**

(54) CONTAINER MONITORING SYSTEM

(76) Inventor: Gregory J. Hummer, Shaker Heights, OH (US)

( * ) Notice: Subject to any disclaimer, the term of this patent is extended or adjusted under 35 U.S.C. 154(b) by 422 days.

This patent is subject to a terminal disclaimer.

(21) Appl. No.: 13/029,399

(22) Filed: Feb. 17, 2011

(65) Prior Publication Data

US 2011/0133925 A1 Jun. 9, 2011

Related U.S. Application Data

(60) Provisional application No. 61/321,257, filed on Apr. 6, 2010, provisional application No. 61/385,340, filed on Sep. 22, 2010.

(51) Int. Cl.
*G08B 1/08* (2006.01)
*B60R 25/10* (2013.01)

(52) U.S. Cl.
USPC .............. 340/539.13; 340/539.1; 340/539.17; 340/539.26; 340/426.19

(58) Field of Classification Search
None
See application file for complete search history.

(56) References Cited

U.S. PATENT DOCUMENTS

| | | | | |
|---|---|---|---|---|
| 7,005,982 | B1 * | 2/2006 | Frank | 340/539.26 |
| 7,109,859 | B2 | 9/2006 | Peeters | |
| 7,151,447 | B1 | 12/2006 | Willms et al. | |
| 7,176,793 | B1 | 2/2007 | Hummer | |
| 7,292,828 | B1 | 11/2007 | Liu et al. | |
| 7,638,252 | B2 | 12/2009 | Stasiak et al. | |
| 7,872,575 | B2 * | 1/2011 | Tabe | 340/540 |
| 2004/0119591 | A1 | 6/2004 | Peeters | |
| 2005/0236478 | A1 | 10/2005 | St. Clair et al. | |
| 2006/0177376 | A1 * | 8/2006 | Tomalia et al. | 424/9.3 |

OTHER PUBLICATIONS

Barry, et al., "Printing nanoparticles from the liquid and gas phases using nanoxerography," Nanotechnology 14 (2003) 1057-1063.

* cited by examiner

*Primary Examiner* — Julie Lieu
(74) *Attorney, Agent, or Firm* — Fay Sharpe LLP

(57) ABSTRACT

A detection system for an enclosed container includes many nanosensors for detecting materials harmful to human beings within an enclosed container and transmitting a signal representing a condition thereof. The nanosensors are carried on a carrier material, such as a corrugated sheet. At least one detection device detects a condition of the nanosensors and outputs a signal responsive thereto, which can be received by a monitoring system external to the container. Containers which have harmful materials within them can be inspected or stopped before entering the country.

27 Claims, 5 Drawing Sheets

CONTAINER MONITORING SYSTEM

This is application claims the priority, as a continuation-in-part, of application Ser. No. 12/707,062, filed on Feb. 17, 2010, and claims the priority, as a continuation-in-part, of application Ser. No. 11/705,142 (now U.S. Pat. No. 7,667,593, issued on Feb. 23, 2010), from which the 12/707,062 application claims priority, and claims the priority of application Ser. No. 10/998,324, filed on Nov. 29, 2004 (now U.S. Pat. No. 7,176,793), from which the Ser. No. 11/705,142 application claims priority. This application also claims the benefit of Application Ser. No. 61/321,257, filed on Apr. 6, 2010, and of Application Ser. No. 61/385,340, filed on Sep. 22, 2010. The disclosures of all of these applications are incorporated herein by reference in their entireties.

BACKGROUND

The present exemplary embodiment relates to the detection arts. It finds particular application in conjunction with cargo containers which are used to ship products, foodstuffs, and other materials from one country to another, and will be described with particular reference thereto. However, it is to be appreciated that the present exemplary embodiment is also amenable to other like applications.

Cargo containers are widely used for shipping materials by land or by water from one country to another. Knowing the contents of such containers has become of increasing importance in detecting potential threats. It has thus become extremely important to monitor the contents of such containers for harmful materials, such as explosives, harmful biological and chemical materials, and radiation materials.

U.S. Pat. No. 7,176,793 discloses a detection device in the form of a strip for use in an enclosed container. The detection strip includes sensors of macro, meso or nanosize, all of which are referred to herein as nanosensors, for detecting materials that are harmful to human beings within an enclosed container and for transmitting a corresponding resonance frequency. One or more detection strips are initially placed within a container, depending on the size of the container. The detection devices are designed to send off specific resonant frequency signals which can be detected by voltage changes and/or current changes which are correlated to any harmful material detected within the container. A serial number computer chip is provided for specifically identifying the detection device and transmitting a corresponding resonance frequency, which allows the container to be identified. A power source is provided for operating the detection strip. A hand-held or stationary monitor is provided for monitoring the container for any signals given off from the detection strips within the container. The detection devices are designed to give off a predetermined amount of background signal. In consequence, if no such signals are received, the container is highly suspect as being tampered with, allowing such a container to be quickly removed and its contents examined.

For some applications, hazardous materials may be at relatively low concentrations, for example hazardous nuclear materials may be distributed in amongst other materials or chemical or biological warfare agents may be in small concentrations within the container. As a consequence, the detection device may give off an intermittent or no signal. One solution is to enlarge the size of the detection strip. However, very large detection strips may be unwieldy and difficult to attach to the container.

The exemplary embodiment provides a solution to this problem by incorporating the nanosensors in a device which is mounted to one or more interior walls of the container. The nanosensors are extremely small detectors, of micro, meso, or nano-size. The signals output by the nanosensors can be received by one or more detection devices which communicate the signals to an exterior monitor.

BRIEF DESCRIPTION

In accordance with one aspect of the exemplary embodiment, a detection system for an enclosed container includes many nanosensors for detecting materials harmful to human beings, within an enclosed container and transmitting a corresponding resonance frequency and at least one detection device which detects a condition of the nanosensors and outputs a signal responsive thereto. The nanosensors are carried by a carrier material, such as a sheet of paper. The sheet can be grooved, e.g., corrugated, and supported in an assembly between two parallel support members, such as plates or cylinders, to provide a series of hollow passages through which detectable materials are carried by a gradient air flow or forced air flow.

In another aspect, in combination, a cargo container in which any suitable cargo is placed for transport from one place to another place, a detection system disposed in the container for detecting tampering with the container, the detection system including numerous nanosensors which are designed to transmit a predetermined frequency, means of storing and transmitting information about the condition of the nanosensors, and a power source for operating the detection system. The nanosensors are carried by a carrier material, such as a sheet of paper. The sheet can be ridged, and supported in an assembly between two parallel support members to provide a series of hollow passages through which detectable materials are carried by gradient air flow or forced air flow.

In another aspect, a method for detecting harmful materials includes providing forming an assembly comprising a carrier material with nanosensors thereon and two parallel support members to provide a series of hollow passages through which detectable materials are carried by a gradient air flow or forced air flow. The assembly is disposed in an enclosed container, such as on a wall thereof. Signals output by the nanosensors are monitored with a monitoring device external to the container.

DETAILED DESCRIPTION

Figure 1:
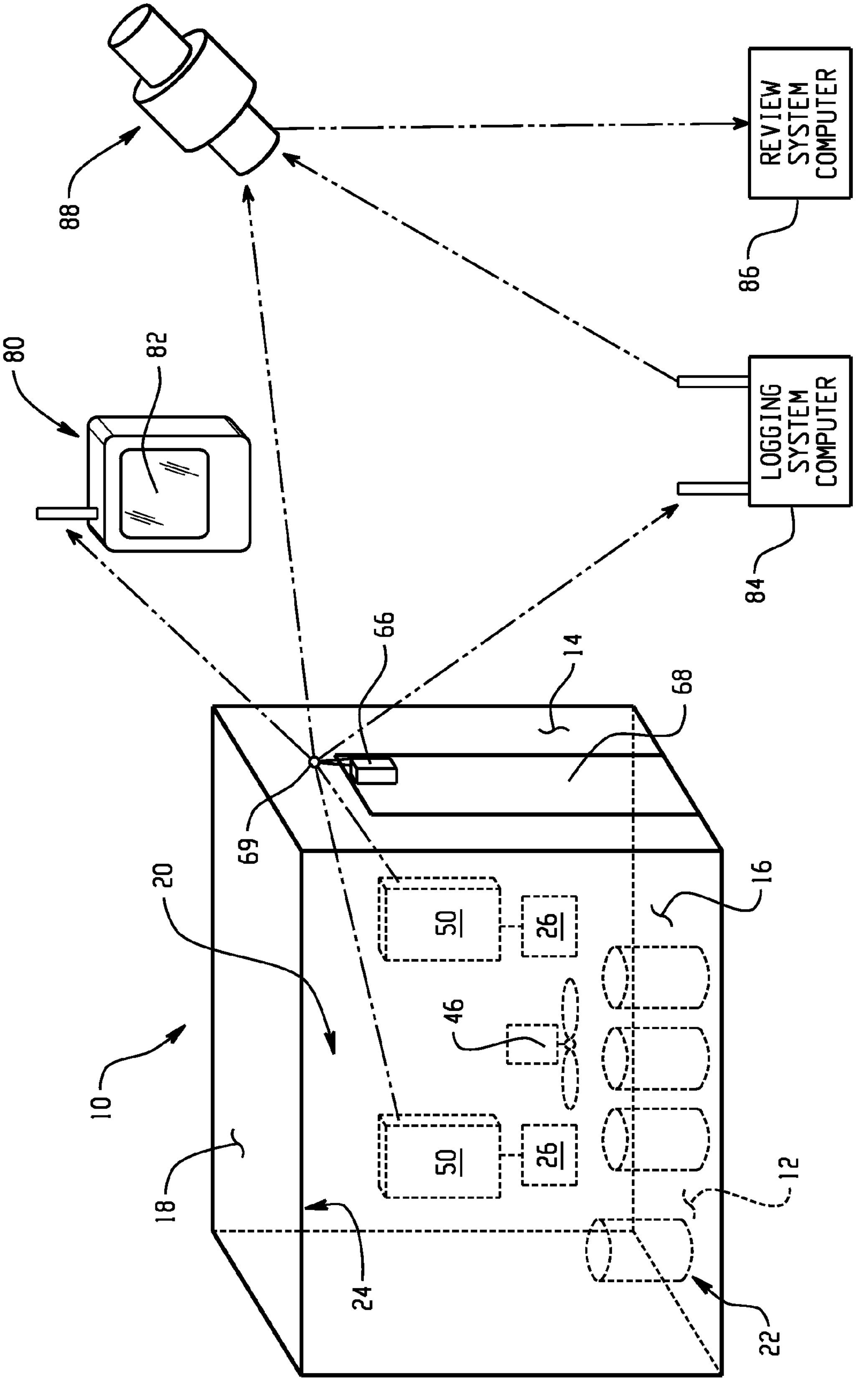
FIG. 1 is a perspective view of a shipping container and monitoring system in accordance with one aspect of the exemplary embodiment.

With reference to FIG. 1, there is shown a container 10 which can be of any size, including large cargo containers. Cargo containers 10 are generally made of metal and include eight walls, namely, a bottom 12 with a pair of opposing, upstanding similar sides 14, a pair of similar opposing ends 16, and a top 18, for covering and closing the cargo container 10. The walls 12, 14, 16, 18 may be made of metal, such as steel or alumina, or from non-metallic material, such as carbon fiber, or a combination thereof.

The walls 12, 14, 16, 18 define an interior space 20 for receiving a cargo 22, such as a liquid, solid, or other material. Each wall has an interior surface 24, some or all of which may be in contact with the cargo 22. Extremely small detectors, of micro, meso, or nano size (which are referred to herein as nanosensors), are carried within the container, e.g., on the interior surfaces 24 of the walls, in one or more nanosensor assemblies 26.

Figure 2:
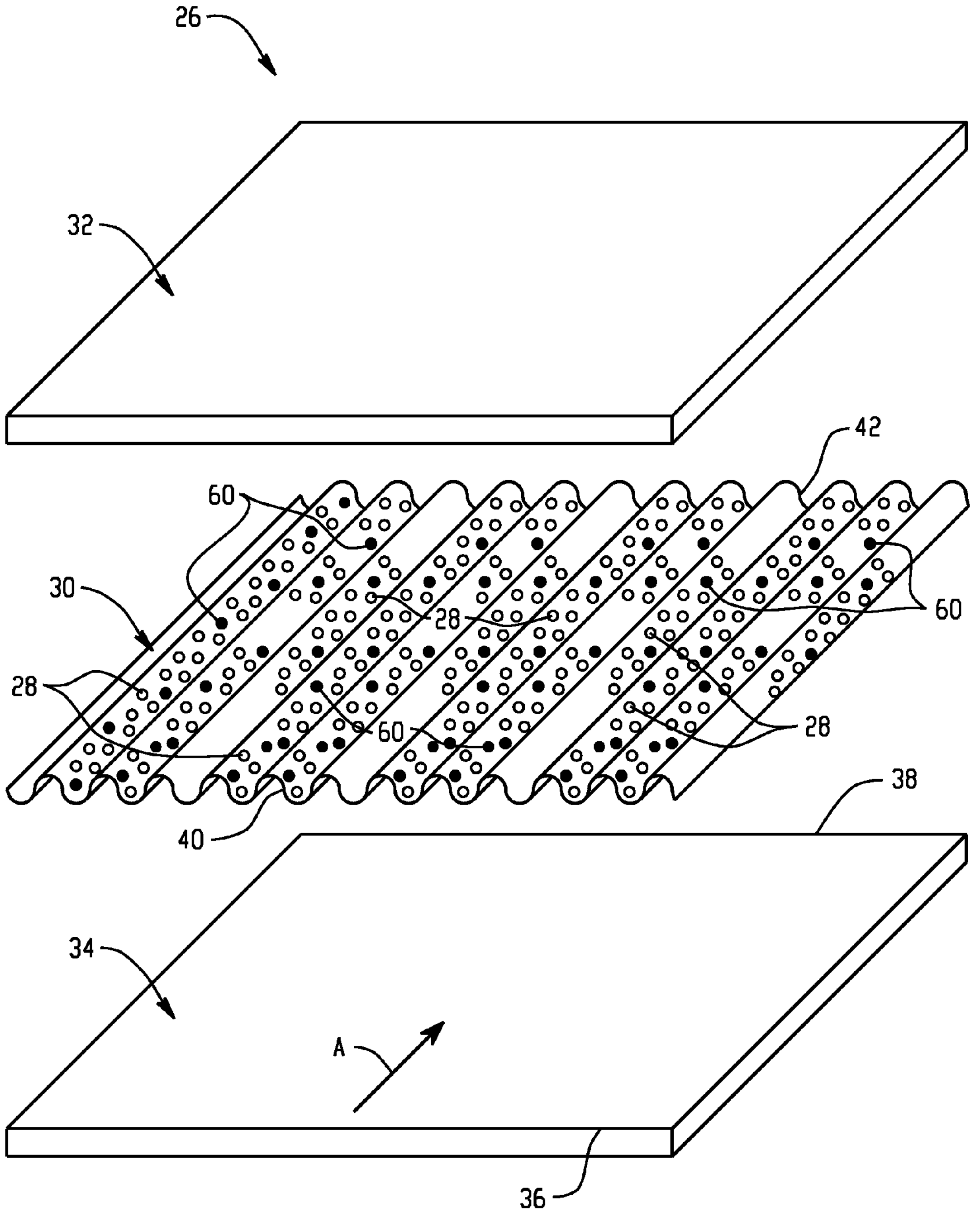
FIG. 2 is an exploded perspective view of one embodiment of a nanosensor assembly of the detection system of FIG. 1.

With reference to FIG. 2, one embodiment of a nanosensor assembly 26 is shown in exploded view. The nanosensor assembly 26 includes numerous nanosensors 28, which are supported on a carrier material 30, such as a sheet of paper, plastic, or other flexible sheet material.

In some embodiments, the nanosensors 28 can, singly or in combination, detect many different harmful materials, such as explosives, radioactive materials, harmful chemicals, and biological gases, germs, illegal drugs, or combinations thereof, and the like. For example, the nanosensors 28 may detect harmful materials, such as explosives (e.g., nitrogen-based explosives, such as trinitrotoluene (TNT), and peroxide-based explosives, such as triacetonetriperoxide (TATP) and hexamethylenetriperoxidediamine (HMTD)), radioactive materials, harmful chemicals, such as chemical warfare agents and nerve gases (e.g., G-type, V-type, and H-type agents, such as organophosphate nerve agents such as the G-series nerve agents tabun (ethyl-N, N dimethyl phosphoramino cyanidate, agent GA), sarin (isopropyl methyl phosphonofluoridate, agent GB), soman (methylphosphonofluoridic acid 1,2,2-trimethylpropyl ester, agent GD), cyclosarin (agent GF);). V-type nerve agents such as methyl phosphonothiolates, e.g., O-ethyl S-(2-diisopropylaminoethyl) methylphosphonothioate (agent VX); H-type agents such as di (2-chloroethyl) sulfide (mustard gas or Agent HD) and dichloro (2-chlorovinyl) arsine (Lewisite)), biological materials, such as such as gases, anthrax and other germ warfare agents, narcotics and other illegal drugs, or combinations thereof.

In some cases, nanosensors 28 may be configured for detection of heat in the container wall, e.g., a temperature above those normally experienced by the container 10 which is indicative of tampering, e.g., from the heat applied by a blow torch. In other embodiment, the nanosensors 28 are capable of detecting small changes in heat and chemicals, such as carbon dioxide from the breath, resulting from the presence of humans or animals in the container.

In particular, the nanosensors produce and transmit resonant frequencies (detected by small changes in voltage and/or current) corresponding to the harmful materials or other detected chemicals and/or physical changes in the container. Depending on the materials to be detected, different nanosensors may be used, singly or in combination. For example, the nanosensors may be in the form of particles comprising a substrate such as carbon (e.g., carbon nanotubes and/or nanocatalysts particles) to which a receptor molecule may be bound that is specific for a particular harmful substance (or class of harmful substances) or that is responsive to a change in physical conditions, such as responsive to heat.

The carrier material 30 is carried by at least one support member. In the illustrated embodiment, the carrier material 30 is positioned between two support members 32, 34, arranged in parallel, to define at least one through passage from a first, leading end 36 to a second, trailing end 38 of the support member(s) in the direction of arrow A. The support members 32, 34 may be formed from a rigid material such as metal, plastic, or cardboard, and in one embodiment, the support member(s) may also carry nanosensors on their interior and/or exterior surfaces. The support members 32, 34 shown in FIG. 2 are in the form of plates. Other support member arrangements are also contemplated, such as a tube, spiral, or the like. For example, in the embodiment of FIG. 3, the support members 32', 34' are cylindrical.

Figure 3:
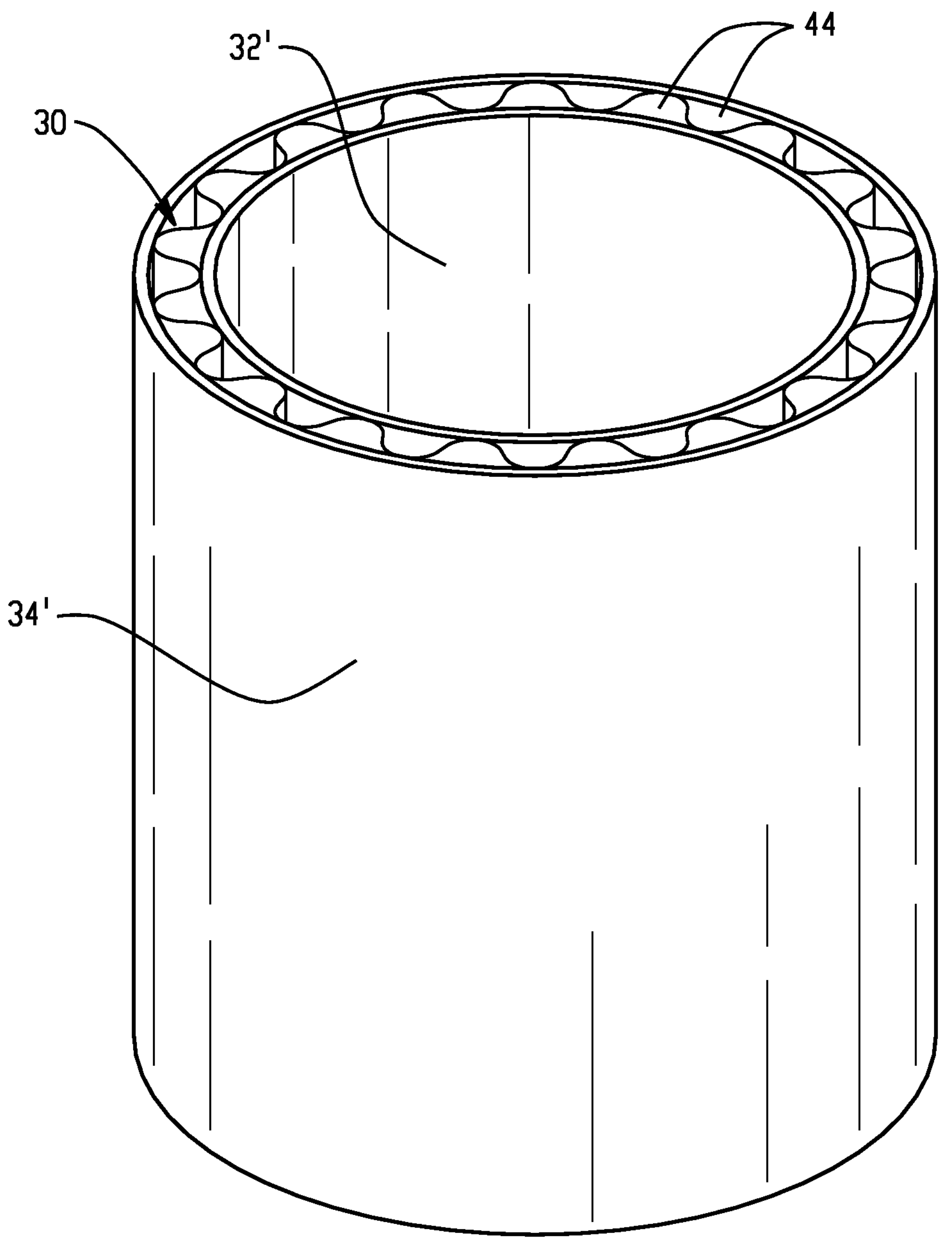
FIG. 3 is a perspective view of another embodiment of a nanosensor assembly of the detection system of FIG. 1.
Figure 4:
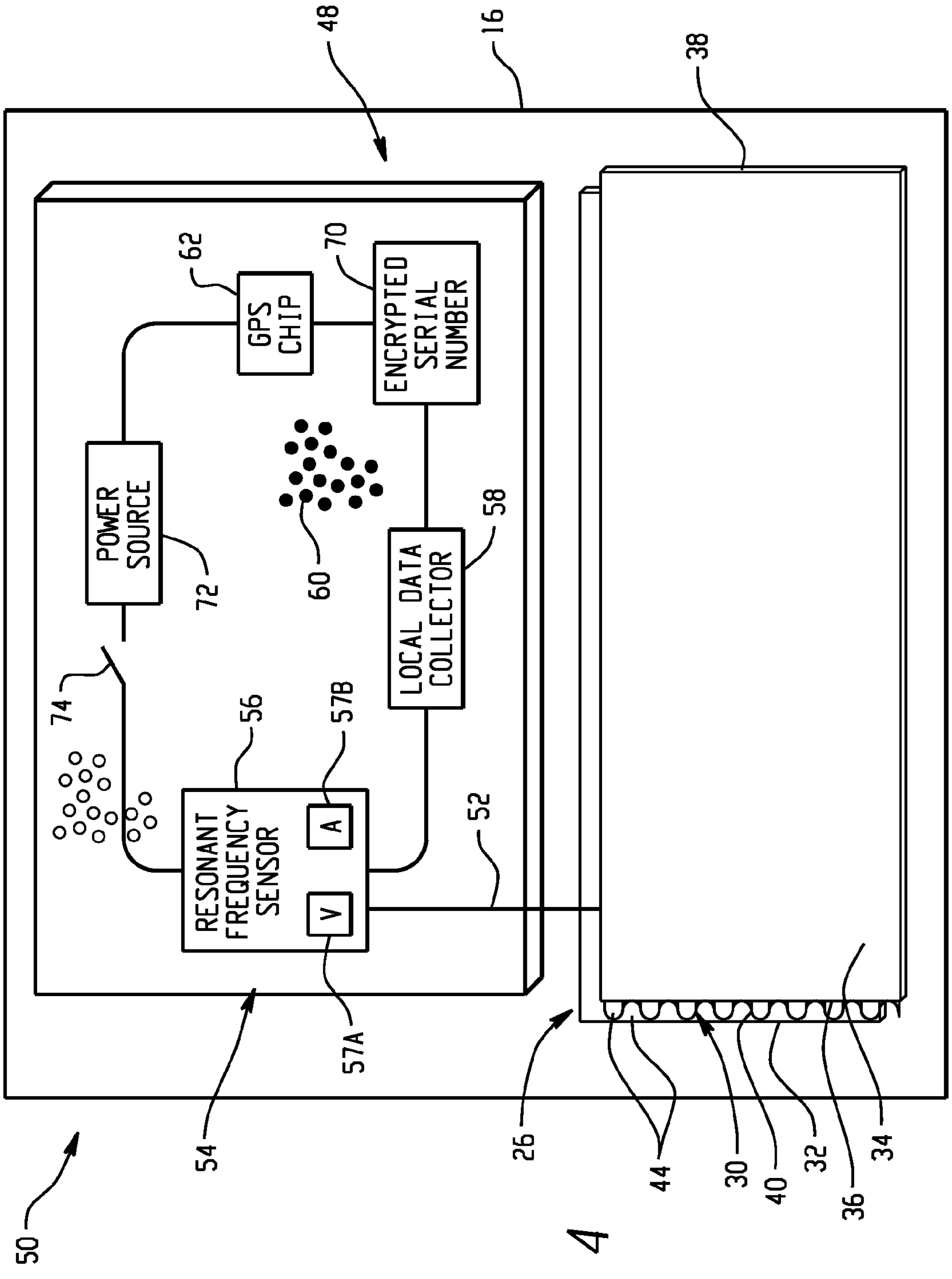
FIG. 4 is a perspective view of one embodiment of a detection system including the nanosensor assembly of FIG. 2.

The carrier member 30 is ridged, e.g., corrugated, as shown in FIG. 2 or pleated in concertina fashion, to provide the carrier member 30 with a surface area which is larger than the area of the two adjacent support members 32, 34 or 32', 34'. The ridged carrier member 30, e.g., corrugated sheet, has alternating ridges and channels extending from a first, leading edge 40 to a second, trailing edge of the sheet 42. When sandwiched between the support members 32, 34 or 32', 34', the ridges and channels define a series of parallel, hollow passages 44, which extend between ends 36, 38 of the support members, as illustrated in FIGS. 3 and 4. Fluid such as air, which may carry with it detectable amounts of harmful materials, flows through the assembly 26, bringing the harmful materials into contact with the nanosensors 28. Airflow may be natural or assisted. For example, an air movement device 46 (FIG. 1), such as a fan, heater, suction device, or the like, may be provided adjacent one end of the assembly 26 to increase the flow of air or other fluid through the passages 44 of the assembly.

While each assembly 26 is shown as including a single sheet of carrier material 30, it is to be appreciated that an assembly 26 may include two or more such sheets which provide through passages 44 for fluid flow therethrough.

As illustrated in FIG. 4, a detection system 48 includes at least one nanosensor assembly 26 linked to a detection device 50. Detection device 50 receives a signal representing a condition of the nanosensor assembly/nanosensors. Depending on the size of the container 10, one or more nanosensor assemblies 26 are placed within the container, e.g., mounted to the wall(s) 14, 16 etc. of the container, as illustrated in FIG. 1. One or more of detection devices 50 may also be placed within the container 10. In the exemplary embodiment, the detection devices are located proximate the respective nanosensor assemblies 26, e.g., fixed to an interior surface 24 of a container wall. The exemplary detection devices 50 are capable of withstanding extremes of temperatures, humidity, vibrations, and salt air. Resonant frequencies emitted by the nanosensors 28 are carried to the detection device 50. The transfer of resonant frequencies, or current or voltage changes induced by them, may be aided by wires supported by the carrier material 30 and/or by having multiple collectors, serving as repeater stations, disposed around the container walls which forward the resonant frequencies e.g., amplified, to the detection device 50. The nanosensors can be configured to set off adjacent like sensors so that a very large volume of a particular type of nanosensor(s) change their resonant frequency. This chain-like reaction thus helps to detect the very small voltage change over a distance.

In the exemplary embodiment, the nanosensors 28 may be laid down on the carrier material 30, e.g., by printing. The wires (not shown) which transmit the resonant frequencies/electrical signals from the nanosensors 28, e.g., as a voltage difference or a change in current, may also be laid down by printing techniques, e.g., as strips of silicon, conductive polymer, copper, or other material through which the resonant frequencies or signals derived therefrom are carried. The connecting wires are ultimately connected to one or more collector wires 52, which are connected to the detection device 50. Suitable methods for printing nanosensors and connecting wires include silk screen printing, ink jet printing, and electrophotography (see, e.g., Jie Shen, et al., "An iridium nanoparticles dispersed carbon based thick film electrochemical biosensor and its application for a single use, disposable glucose biosensor," Sensors and Actuators B 125 (2007) vol. 1, pp. 106-113; U.S. Pat. No. 7,638,252, entitled ELECTROPHOTOGRAPHIC PRINTING OF ELECTRONIC DEVICES, by Stasiak, et al.; and Chad R. Barry, et al., "Printing nanoparticles from the liquid and gas phases using nanoxerography," Nanotechnology 14 (2003) 1057-1063).

The detection device 50, as best seen in FIG. 4, comprises a flexible strip 54, which may be composed of any suitable plastic material. The detection device 50 includes a sensor device, such as a chip 56, or other means for measuring the resonant frequency, voltage change or current change received from the nanosensors 28. The sensor 56 may be embedded in or otherwise supported by the strip 54. The sensor chip 56 detects the resonant frequencies transmitted by the nanosensors or intermediate collectors, e.g., as a small change in voltage or current (e.g., using a voltage change detector 57A and/or current change detector 57B), and generates a signal responsive thereto, such as a voltage signal or simply an amplification of the resonant frequency. One specific signal may be reserved for chemical warfare agents, another for radioactive materials, and so forth. Or, each particular harmful material may have its own specific signal. A transmitter chip 58, such as an LDA (local data adapter/collector), capable of multiplexing data transmitted by the encrypted serialized chip 58 is supported on the strip 54. In one embodiment, the LDA 58 is capable of data transmission by satellite uplink and/or by direct line of sight up to 15-30 miles. U.S. Pat. No. 7,292,828, the disclosure of which is incorporated herein by reference, discloses one multichannel transmitter which employs wireless telemetry to send signals indicative of harmful materials to a remote receiver that may be used herein. Sensor chip 56 and LDA 58 may be separate or combined into a single chip. In other embodiments, encrypted RF data signals are sent from the LDA 58 to a transponder 66 (FIG. 1) which transmits the signals to a remote or local data transmission device. In a container with multiple detection devices, each one may have its own LDA 58 which communicates with transponder 66.

In addition to the nanosensors 28 which emit resonant frequencies in response to detection of harmful materials, a separate and distinct calibrated general background resonant frequency may be emitted by a specific group of the nanosensors 60. These nanosensors 60 may be carried by the carrier material 30, together with the nanosensors 28 and/or are embedded in the strip 54.

A global positioning system (GPS) computer chip 62 may be embedded in the detection strip 54 for providing a signal representative of the location of the strip 54 and its associated container. For containers 10 which are below deck and/or covered by many other containers, the chip 62 may receive a signal from a corresponding GPS chip in a local container if the satellite signal is too weak to be picked up.

Transponder 66 may be exterior or interior of the container 10. In one embodiment, the transponder 66 (e.g., conforming to an RF protocol like Dash-7, ISO 18,000-7) may be mounted to a door 68 of the container 10, as illustrated in FIG. 1, to transmit signals from the strip 54 to a location outside the container. In one embodiment, transponder 66 may be mounted to an inside of the door 68, i.e., within the container interior 20, with an antenna 69 for the transponder being located on the outside of the door. The outside antenna 69 may include an indicator system to provide a visual or aural indication of the status of the container 10. For example, an orange light may be illuminated if the system 48 is not working properly and a red light may be illuminated if the detection strip 54 has a sensor hit. The antenna 69 may communicate using ISO18,000-7 protocol (Dash-7) or other RF protocol to a ship controller. A commercially available tamper-proof container door latch including a transponder 66 with an antenna 69 that uses Dash-7 sensing of temperature, humidity, shock and entry may be used as the transponder 66, with suitable modifications to enable transmission of data, which may be encrypted, from the detection system 48. Exemplary transponder devices of this type are sold under the tradename SAVI® (e.g., SAVI®ST-675) by Lockheed Martin Co.

As illustrated in FIG. 4, an encrypted serial numbered (ESN) computer chip 70 may also be embedded in or otherwise supported by the strip 54. The ESN chip 70 generates a signal corresponding to the device's unique serial number which may also be transmitted via the LDA 58. The components of the detection device 50, such as the sensor chip, LDA chip, and GPS chip may all be powered by a single power source or by separate power sources, such as a battery. For example, a low voltage motion activated power source 72 is carried by the strip 54. The power source 72 may be disconnected from the components by a magnetic switch 74 which completes the circuit with the components 56, 58, 62, 70 only intermittently. The container 10, when moved, may activate the power source 72 to maintain operation of the detection device 50. In this way, the power source is not drained two quickly. A battery thus may last for about two years before it needs to be replaced.

The exemplary GPS chip 62 stores not only the origin of a particular container 10, but tracks the route which the container 10 travels from the origin to its destination which, for our purposes, is the United States. This information can be readily accessed from the GPS chip 62. Each detection device 50 has a branded serial number which is readily seen and is to be recorded on the container shipping manifest. The ESN chip 70 stores an encrypted copy of the serial number that is specific to the one or more particular detection devices 50, which are assigned to the container 10 involved. The ESN chip 70 produces and transmits a distinct resonant frequency which can be accessed and used to track down the owner of the detection devices 50 within the container 10, since a log of the owner of every detection device 50 is maintained, along with data pertaining to the manifest, the shipper, origin, and destination of the container 10. The strip 54 may be equipped with anti tamper logic, e.g., in the LDA chip 58. Each detection device 50 may have its own distinct ESN computer chip 70. Otherwise, it may be difficult to determine if one of the ESN computer chips 70 was destroyed or removed from the container 10, if all three ESN computer chips 70 were identical and transmitted the same resonant frequency.

Figure 5:
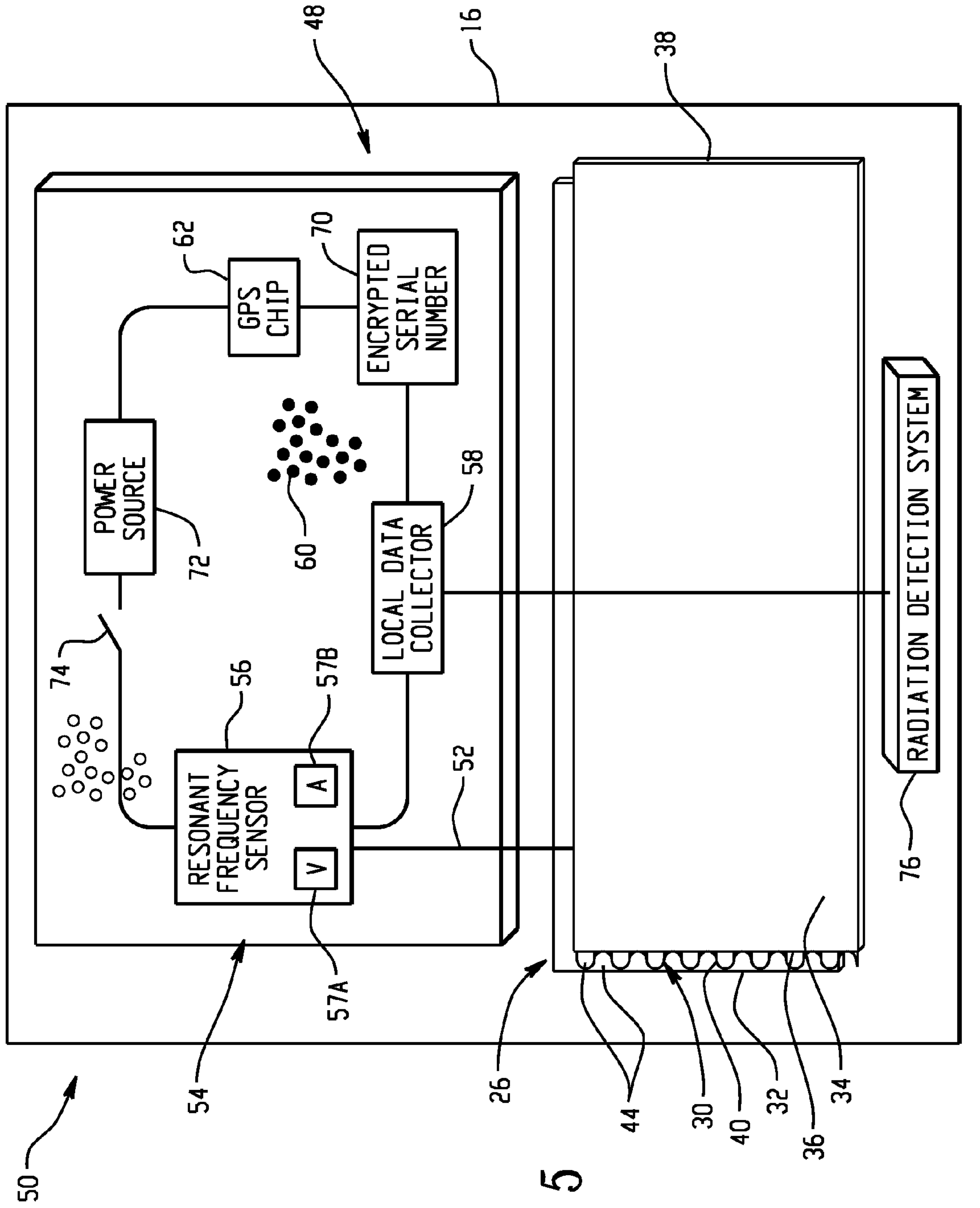
FIG. 5 is a perspective view of another embodiment of a detection system including the nanosensor assembly of FIG. 2.

While the detection device 50 is shown as separate from the nanosensor assembly 26, in some embodiments the detection device 50 and assembly 26 may be combined, e.g., the nanosensor assembly 26 may be mounted to the strip 54, as illustrated in FIG. 5. As will be appreciated, in the exemplary detection system 48, two or more nanosensor assemblies 26 may be communicatively linked to a single detection device 50.

For detection of radiation generating materials, in addition to or as an alternative to the nanosensors, a radiation detection system 76 (FIG. 5) comprising one or more conventional scintillation counters may be employed to detect neutrons and high energy gamma rays or their reaction bi-products. The radiation detection system 76 may be linked to the detection device 50 to provide counts corresponding to detected radiation. In the embodiment shown in FIG. 5, the radiation detection system 76 is mounted to the same adhesive-backed strip 54, which carries the detection device 50 and nanosensor assembly 26. For example, radiation detection system 76 may include plastic scintillators which can very easily be shaped and machined to the forms desired in detectors (cylinders, rods, flat sheets, fibers, microspheres and thin films). Scintillators coupled to a photomultiplier tube detect ionizing radiation, such as the photons produced when high energy gamma rays emitted by the radiation generating materials interact with solid materials, or neutrons. Solid materials, such as those with high stopping power, may be placed intermediate the container interior and the scintillators of the radiation detection system 76 to absorb gamma rays and generate the detectable photons. As the solid material, $LaBr_3(Ce)$, for example, offers a higher stopping power for gamma rays (density of 5.08 g/cm$^3$ versus 3.67 g/cm$^3$ for NaI(TI)). LYSO ($Lu_{1.8}Y_{0.2}SiO_5(Ce)$) has an even higher density (7.1 g/cm$^3$), is non-hygroscopic, and has a high light output (32 photons/keV $\gamma$), in addition to being rather fast (41 ns decay time).

Gamma radiation may also be detected through its ability to dissociate atmospheric nitrogen and oxygen, resulting in the formation of nitrogen dioxide, which in turn serves as an ozone catalyst and thus can be detected through reductions in ozone levels. Other detection methods include the use of photodissociative bacteria or algae which respond to the photons generated, as well as topaz/silica, which turns from clear to blue in the presence of some forms of radiation.

As illustrated in FIG. 1, an external monitoring system may include any suitable hand-held or stationary monitoring device 80. This is used to monitor the resonant frequencies produced/signals generated and transmitted by the nanosensors 28 via the detection device 50 and the GPS and ESN computer chips 62, 70 to reveal the contents of a container 10, whether the contents be hazardous or not. The monitoring device 80 is able to detect a separate and distinct calibrated general background resonant frequency from some of the numerous nanosensors 28, 60, carried in the assembly 26 or embedded in the detection strip 54 as a means to ensure that the detection device 50 is functioning. If not, the container 10 is considered suspect and removed to a remote location for further examination and review or, in some cases, the suspect container 10 may be rejected and sent back to its place of origin. The monitoring device 80 may designed to translate the resonate frequencies received into digital readouts on a screen 82 of the monitoring device 80, and provide printouts at a remotely located printer, if desired. In one embodiment, the monitoring system includes a computer logging system 84 which receives the signals from the devices 50 in the containers 10 and uploads them periodically to a corresponding review system computer 86 remotely located, e.g., located on shore, e.g., in the port of entry, or at a customs post. The signals from the logging system 84 may be transmitted via a satellite link 88. In this way, either on board ship or in port, a reviewer can track the activity in each of the hundreds or thousands of containers on board a container ship wishing to enter port determine if any of the containers pose a threat, and either refuse entry of the container ship to port or provide for an inspection of the container at sea or when it reaches port. For vehicles arriving by land, the reviewer can track the contents of the containers before they reach a customs post or weigh station and prevent the vehicle from crossing the border if appropriate.

The detection strips 54 may each have a sticky side which can firmly adhere to sides of the container 10. When not in use, the sticky side of the detection strip 54 is covered by a protective strip which can be peeled away when the strip 54 is ready to be applied to the container 10. The sticky side of each detection strip 54 may be provided with one or a number of metal studs or strips for contact with the metal, carbon fiber, or painted interior surfaces 24 of a container 10 to facilitate or improve the transmission of the resonant frequencies from the detection devices 50 to a monitoring device 80 outside the container 10. The nanosensor assembly 26 can be mounted to the container wall surface 26 or strip 54 by a similar adhesive.

As will be appreciated, while the exemplary components 56, 58, 62, 70 and power source 72 as well as assembly 26 and radiation detection system 76 are conveniently located on a single strip 54, in other embodiments, some of the components, such as the GPS system, may be located on a separate strip or otherwise mounted to the container wall 14, 16.

Thus, there has been described a unique detection system 48 comprising a detection device 50 and a nanosensor assembly 26 including nanosensors 28 that are placed within an enclosed space 20 of a container 10 to detect one or more solids, liquids, or gases which may prove to be harmful to human beings. For example three separate detection systems 48, disposed against the top and adjacent two sides, midway between the opposing ends of the container 10, may be sufficient to detect signals from the nanosensors 28 corresponding to harmful materials in a standard size cargo container 10.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A detection system for an enclosed container, comprising:

many nanosensors for detecting materials harmful to human beings within an enclosed container and transmitting a corresponding resonance frequency, the nanosensors being carried by a carrier material; and at least one detection device which detects a condition of the nanosensors and outputs a signal responsive thereto.

2. The detection system of claim 1, wherein the carrier material is ridged.

3. The detection system of claim 1, wherein the carrier material is a sheet material.

4. The detection system of claim 1, wherein the carrier material is carried by at least one support member.

5. The detection system of claim 1, wherein the carrier material sandwiched between rigid support members.

6. The detection system of claim 4, wherein the carrier material and support members define through passages between them for passage of fluid therethrough.

7. The detection system of claim 1, wherein the nanosensors are applied to the carrier material by at least one of silk screen printing, ink jet printing, and electrophotography.

8. The detection system of claim 1, further comprising a strip and wherein the detection device and carrier material are supported on the strip.

9. The detection system of claim 7, further comprising a radiation detection system carried by the strip.

10. The detection system of claim 8, wherein the radiation detection system comprises scintillators.

11. The detection system of claim 7, wherein the strip further comprises an adhesive for mounting the detection system to a wall of the container.

12. The detection system of claim 7, wherein the detection device includes at least one metal stud embedded in a sticky side of the strip for contacting walls of the container to facilitate and improve transmission of resonant frequencies from the detection device inside a container.

13. The detection system of claim 1, wherein the detection device comprises at least one of:

a sensor which detects the transmitted resonant frequencies; and a transmitter which transmits signals in response to the detected transmitted resonant frequencies.

14. The detection system of claim 1, wherein the detection device includes an encrypted serial numbered (ESN) computer chip which stores and transmits information about an encrypted serial number that is specific to the one or more particular detection devices.

15. The detection system of claim 1, wherein the detection device includes a global positioning system computer chip for identifying at least one of origin and travel of the detection device and container to which the detection device is attached.

16. The detection system of claim 1, wherein the detection device includes a power source.

17. The detection system of claim 1, wherein the detection device is calibrated to produce and transmit a distinct resonant frequency which is independent of any other frequencies transmitted by the detection device.

18. The detection system of claim 1, wherein the nanosensors are designed to detect one or more harmful materials selected from the group consisting of harmful explosives, chemicals, biological materials, radioactive materials, and illegal drugs.

19. The detection system of claim 1, wherein at least some of the nanosensors are designed to detect heat.

20. The detection system of claim 1, in combination with a monitoring device for receiving signals from the detection device and translating such frequencies into digital readouts on the monitoring device and/or transmitting information about the containers based on the signals to a computer device or printer at a remote location.

21. The detection system of claim 1, further comprising a transponder mounted to a door of the container which transmits signals from the detection device to an external monitoring device remote from the container.

22. In combination, the detection system of claim 1 and an enclosed container to be monitored for said harmful materials.

23. The detection system of claim 21, wherein the container is a cargo container in which foreign products and foodstuffs are shipped into the United States of America.

24. In combination:

a) a cargo container in which any suitable cargo is placed for transport from one place to another place;

b) a detection system disposed in the container for detecting tampering with the container, the detection system including a nanonsensor assembly comprising a ridged carrier material supporting numerous nanosensors which are designed to transmit a predetermined frequency;

c) means of storing and transmitting information about the condition of the nanosensors and optionally a serial number specific to the detection system using an ESN computer chip; and d) a power source for operating the detection system.

25. The combination of claim 24, further comprising a global positioning computer chip for identifying at least one of origin and travel of the container.

26. The combination of claim 24, further comprising means outside the container for receiving resonant frequencies transmitted from inside the container or signals generated by the detection system in response thereto.

27. A method for detecting harmful materials comprising:

forming a nanosensor assembly including positioning a carrier material supporting nanosensors adjacent a support member to provide a series of hollow passages through which detectable materials are carried by a through flow of air, positioning the assembly in an enclosed container; and monitoring signals output by the nanosensors in response to the detectable materials with a monitoring device external to the container.

* * * * *